(12) United States Patent
Su (10) Patent No.: US 11,192,234 B2
(45) Date of Patent: Dec. 7, 2021

(54) TELESCOPIC DEVICE

(71) Applicant: Hong Ann Tool Industries Co., Ltd., Taichung (TW)

(72) Inventor: Cheng-Wei Su, Taichung (TW)

(73) Assignee: Hong Ann Tool Industries Co., Ltd., Taichung (TW)

( * ) Notice: Subject to any disclaimer, the term of this patent is extended or adjusted under 35 U.S.C. 154(b) by 57 days.

(21) Appl. No.: 16/587,162

(22) Filed: Sep. 30, 2019

(65) Prior Publication Data

US 2020/0156235 A1 May 21, 2020

(30) Foreign Application Priority Data

Nov. 16, 2018 (TW) .................................. 107140706

(51) Int. Cl.
  *B25G 1/04* (2006.01)
  *F16B 7/10* (2006.01)
  *B25B 23/00* (2006.01)
  *B25B 23/16* (2006.01)

(52) U.S. Cl.
  CPC ............ *B25G 1/04* (2013.01); *B25B 23/0021* (2013.01); *B25B 23/16* (2013.01); *F16B 7/105* (2013.01)

(58) Field of Classification Search
  CPC .................................. F16B 7/105; B25G 1/04
  See application file for complete search history.

(56) References Cited

U.S. PATENT DOCUMENTS

| | | | | |
|---|---|---|---|---|
| 5,682,641 | A * | 11/1997 | Newman, Jr. | B05C 17/0205 15/144.4 |
| 5,729,865 | A * | 3/1998 | Stoddart | B05C 17/0205 16/429 |
| 6,199,245 | B1 * | 3/2001 | Blessing | B25G 1/06 16/422 |
| 6,435,754 | B1 * | 8/2002 | Canale | F16L 27/1273 403/109.2 |
| 6,832,784 | B1 * | 12/2004 | Chen | A47L 9/244 285/303 |
| 7,025,383 | B2 * | 4/2006 | Canale | A47L 9/244 285/302 |
| 7,510,482 | B2 * | 3/2009 | Benson | A63B 53/00 473/296 |

(Continued)

FOREIGN PATENT DOCUMENTS

| | | |
|---|---|---|
| TW | 554799 U | 9/2003 |
| TW | 563615 U | 11/2003 |
| TW | 201536489 A | 10/2015 |

*Primary Examiner* — Jason W San
(74) *Attorney, Agent, or Firm* — Alan D. Kamrath; Karin L. Williams; Mayer & Williams PC (57) ABSTRACT

A telescopic device includes a first shaft telescopically coupled to a second shaft. The first shaft defines a hole and an orifice. The second shaft defines a plurality of engaging portions. The second shaft inserts in the hole. The second shaft is movable with respect to the first shaft to a position in which one of the plurality of engaging portions is aligned with the orifice. A positioning device is coupled to the first and the second shafts. The positioning device includes a control being movable and a fastener being movable actuated by the control. The fastener is movable with respect to the control. The fastener inserts and is movable in the orifice. The first shaft is adapted to be unmovably positioned with respect to the second shaft at various positions by the positioning device.

19 Claims, 7 Drawing Sheets

(56) References Cited

U.S. PATENT DOCUMENTS

| | | | | |
|---|---|---|---|---|
| 10,611,013 | B2* | 4/2020 | Cavaliere | B25G 1/04 |
| 10,729,955 | B2* | 8/2020 | Knutson | A63B 53/10 |
| 2001/0024594 | A1* | 9/2001 | Taylor | B25G 1/04 |
| | | | | 403/109.7 |
| 2001/0047570 | A1* | 12/2001 | Lanz | B25G 3/26 |
| | | | | 16/429 |
| 2013/0281224 | A1* | 10/2013 | Zabala Scharpp | A63B 60/28 |
| | | | | 473/288 |
| 2014/0064842 | A1* | 3/2014 | Lin | F16B 7/105 |
| | | | | 403/379.5 |
| 2019/0315318 | A1* | 10/2019 | Wake | B08B 1/005 |
| 2020/0078924 | A1* | 3/2020 | Cavaliere | B25G 1/04 |

* cited by examiner

TELESCOPIC DEVICE

BACKGROUND OF THE INVENTION

1. Field of the Invention

The present invention relates to a tool and, particularly, to a tool including a working portion telescopically coupled thereto.

2. Description of the Related Art

Refer to Taiwan Patent No. 554799, a tool includes a handle and an extension rod telescopically coupled to the grip. The extension rod is hollow and receives the handle. Further, the extension rod inserts in a collar. The handle inserts in a sleeve. The sleeve is disposed in the collar. The collar has an eccentric inner peripheral wall. The sleeve includes an outer periphery defining a receptacle. The receptacle receives a tightening rod. The tightening rod is in contact with the inner peripheral wall of the collar. The collar is rotatable with respect to the sleeve to a first position in which the tightening rod tightly presses the handle and a second position in which the tightening rod is disposed away from the handle. The handle is prevented from moving with respect to the extension rod when the collar is rotated to the first position. The handle can move with respect to the handle when the collar is rotated to the second position.

Since the collar can move from the first position to the second position easily, it is easy to cause a problem wherein the handle and the extension rod are in loose engagement which can be dangerous during the operation of the tool.

The present invention is, therefore, intended to obviate or at least alleviate the problems encountered in the prior art.

SUMMARY OF THE INVENTION

According to the present invention, a telescopic device includes a first shaft telescopically coupled to a second shaft. The first shaft defines a hole and an orifice connected to the hole. The second shaft includes an outer periphery defining a plurality of engaging portions. The second shaft inserts in the hole of the first shaft. The first and the second shafts are movable with respect to one another. The second shaft is movable with respect to the first shaft to a position in which one of the plurality of engaging portions is aligned with the orifice.

A positioning device is coupled to the first and the second shafts. The positioning device includes a control being movable and a fastener being movable and actuated by the control. The fastener is movable with respect to the control. The fastener inserts in and is movable in the orifice.

The first shaft is adapted to be unmovably positioned with respect to the second shaft at various positions. When the first and the second shafts are positioned at one of the various positions, the control moves to a first position, and the fastener engages with one of plurality of engaging portions. When the first shaft moves with respect to the second shaft, the control moves to a second position, and the fastener disengages from any of plurality of engaging portions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public generally, and especially the scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

Other objectives, advantages, and new features of the present invention will become apparent from the following detailed description of the invention when considered in conjunction with the accompanied drawings.

DETAILED DESCRIPTION OF THE INVENTION

FIGS. 1 through 7 show a telescopic device in accordance with an embodiment the present invention.

Figure 1:
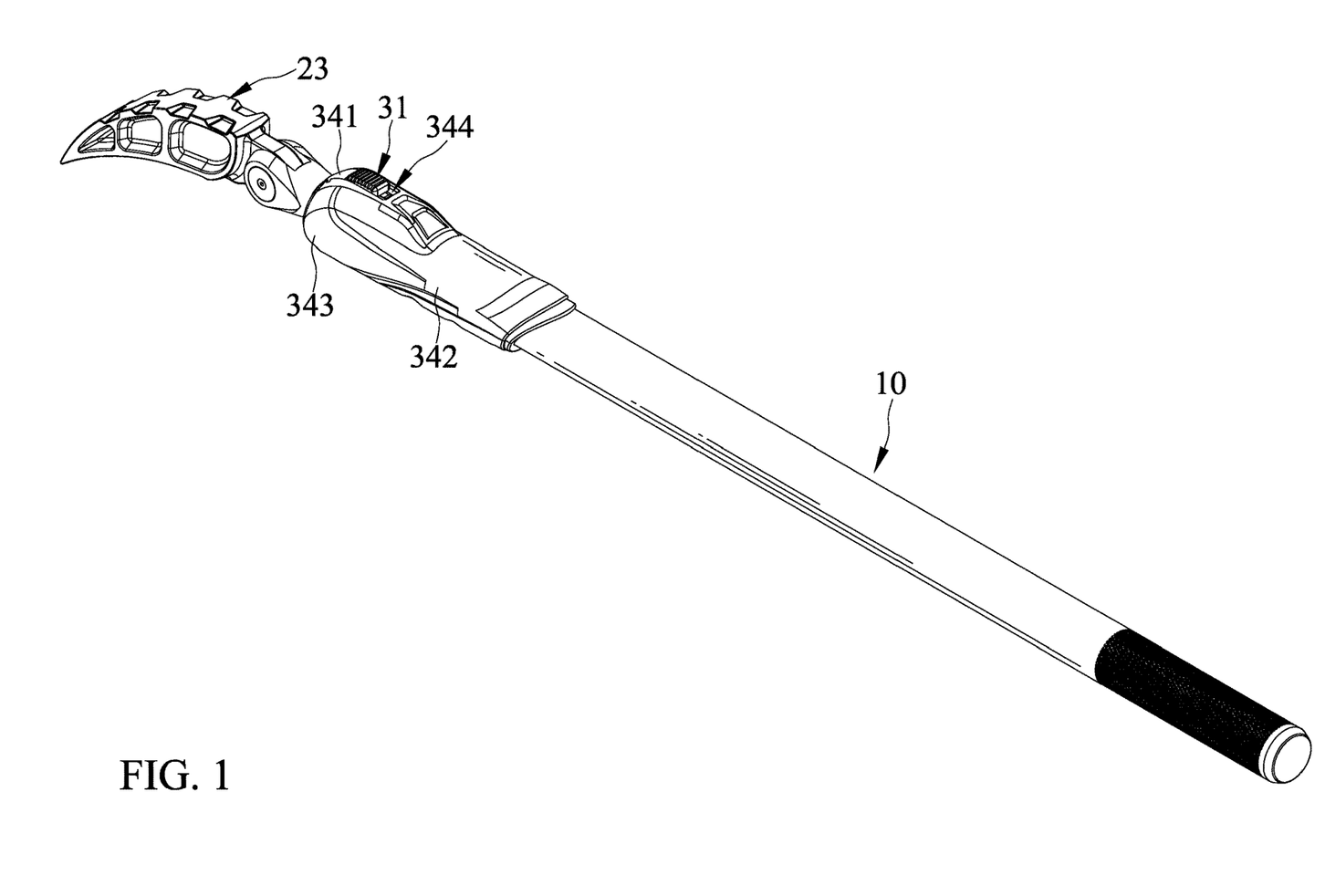
FIG. 1 is a perspective view of a telescopic device in accordance with an embodiment of the present invention.
Figure 2:
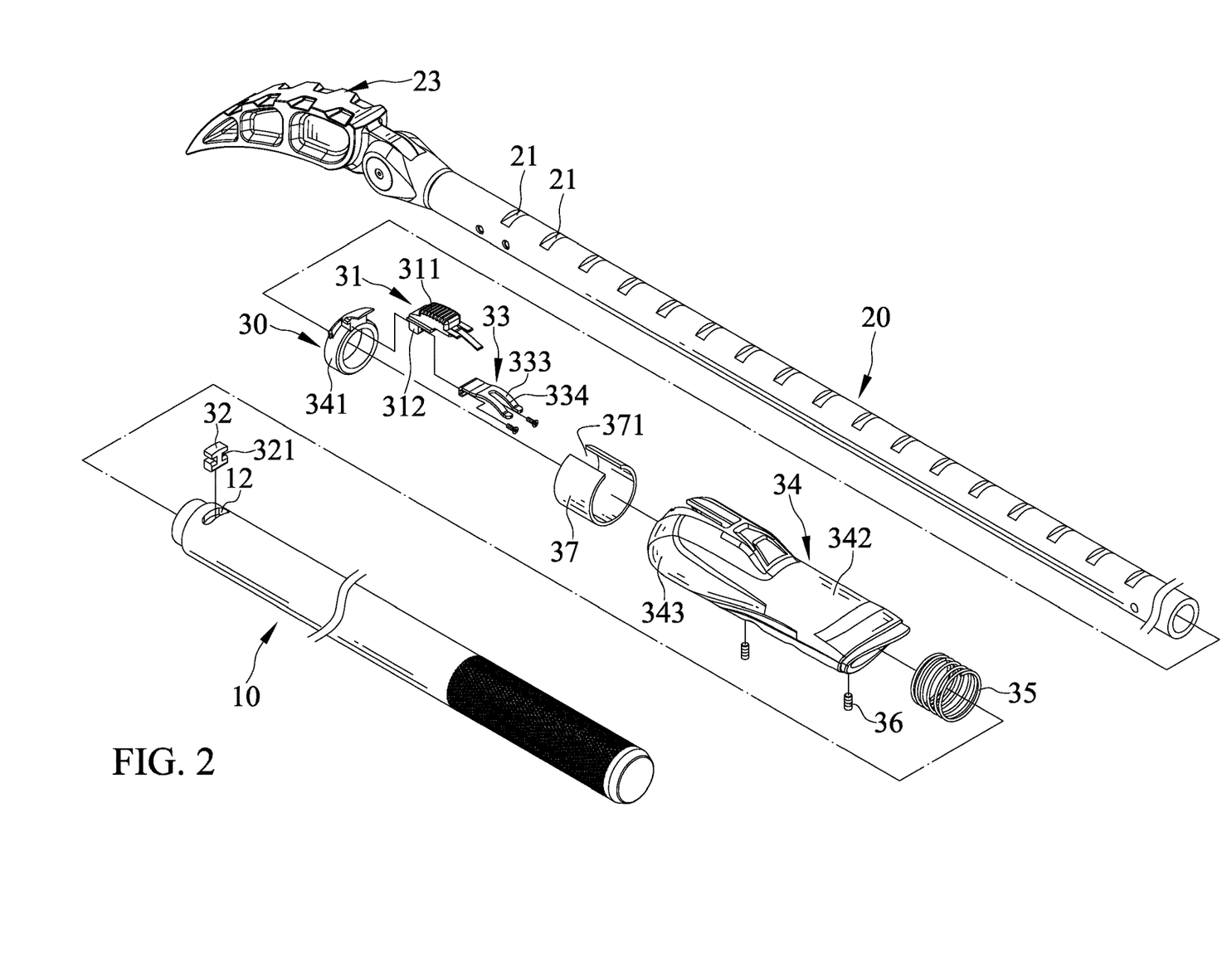
FIG. 2 is an exploded perspective view of the telescopic device of FIG. 1.
Figure 3:
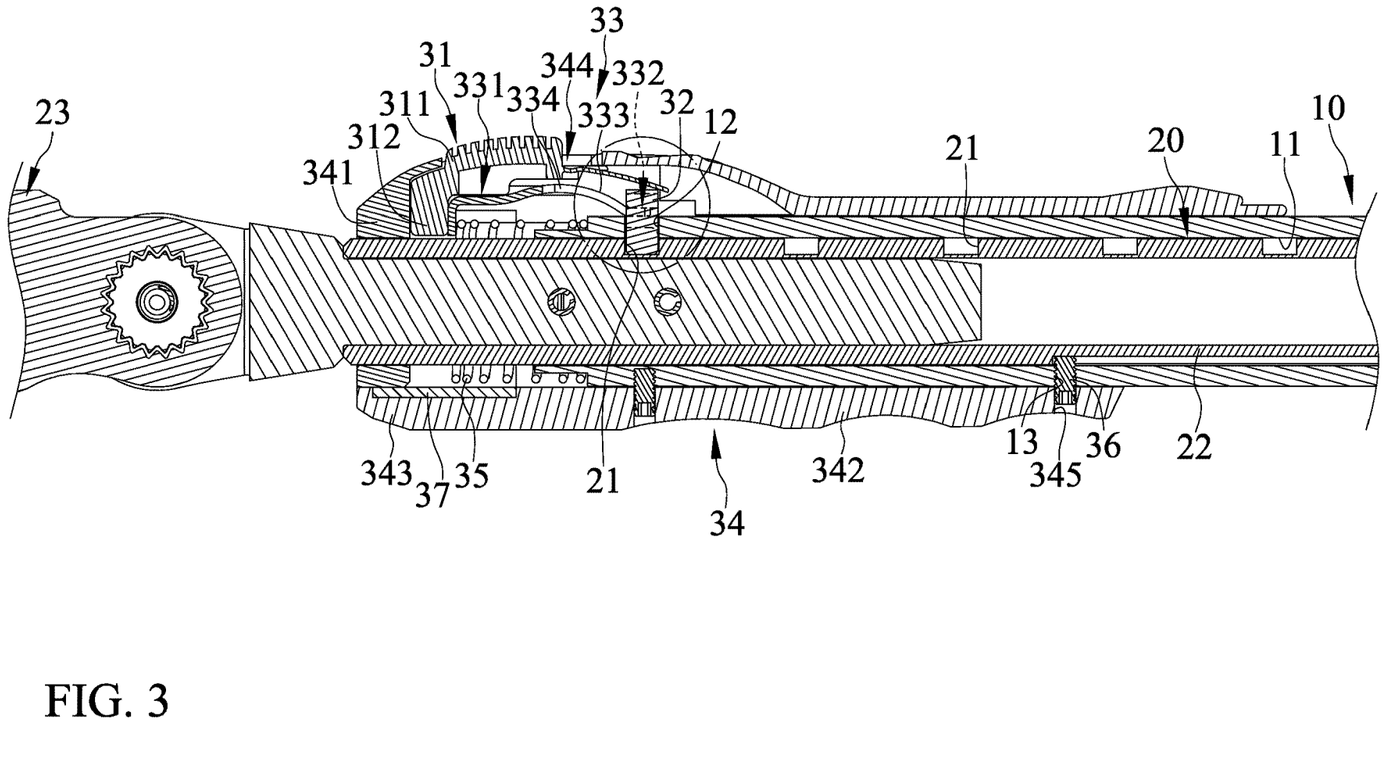
FIG. 3 is a cross-sectional view of the telescopic device of FIG. 1.

A telescopic device includes a shaft 10 and a shaft 20 telescopically coupled to the shaft 10. The telescopic device has a working head 23. The working head 23 extends from the shaft 20. In the embodiment, the working head 23 is adapted to be used as a pry, but not limited thereto. Further, the working head 23 is pivotally connected to the shaft 20, but not limited thereto.

The shaft 10 extends longitudinally from a first end to a second end. The first end of the shaft 10 is an open end. The second end of the shaft 10 is a closed end. The hole 11 extends longitudinally along the shaft 10. The shaft 10 defines a hole 11 and orifices 12 and 13 connected to the hole 11. The orifice 12 extends transversely to the hole 11. The orifice 12 extends from the outer periphery of the shaft 10 to the hole 11.

The shaft 20 inserts in the hole 11 of the shaft 10 and is movable with respect to the shaft 10. The shaft 20 includes an outer periphery defining a plurality of engaging portions 21. The plurality of engaging portions 21 are disposed in sequence along a length of the shaft 20. The shaft 20 is movable with respect to the shaft 10 to a position in which one of the plurality of engaging portions 21 is aligned with the orifice 12.

Each of the plurality of engaging portions 21 is in a form of a recess.

Figure 5:
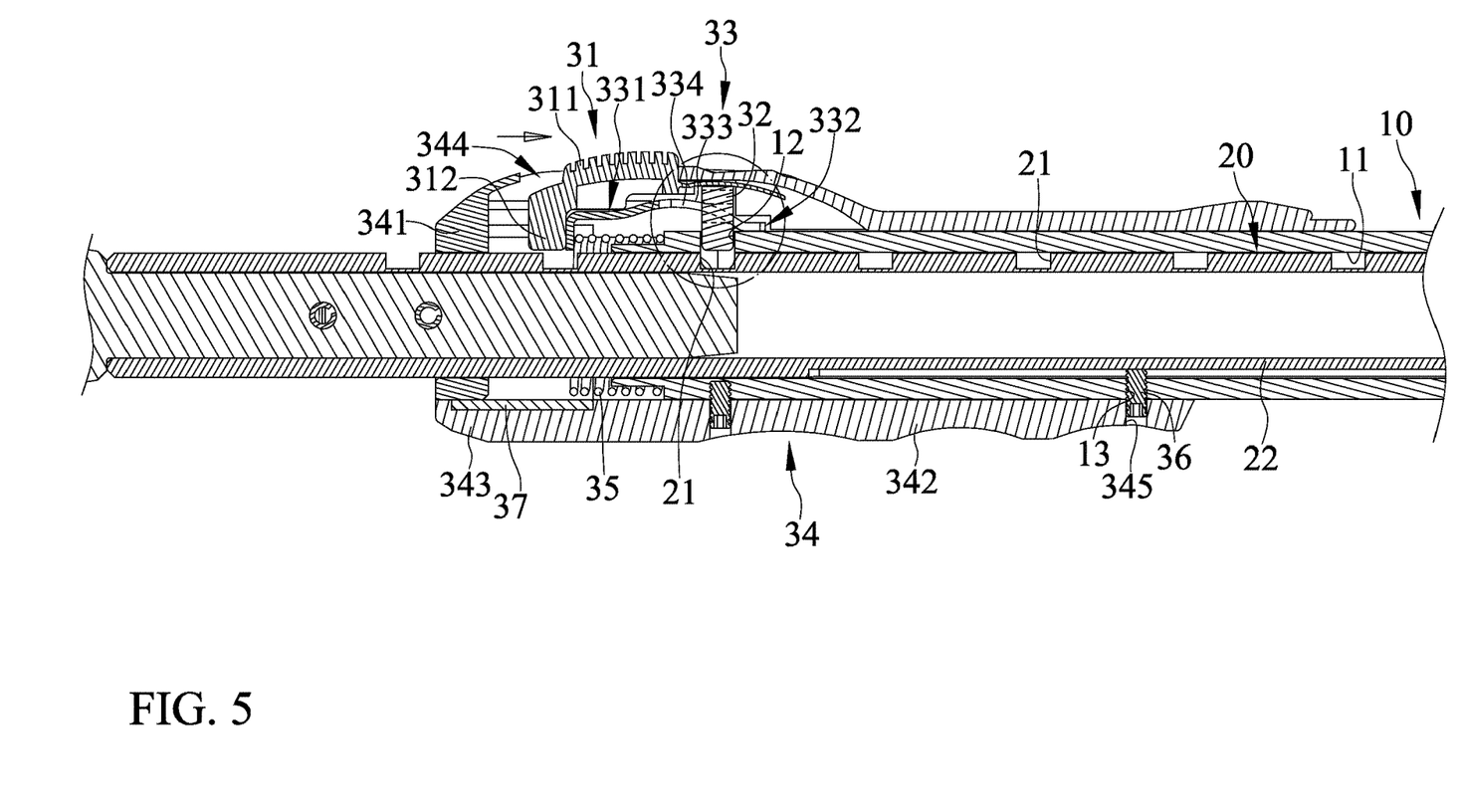
FIG. 5 is a cross-sectional view of the telescopic device of FIG. 1, which includes a positioning device in a release position in which a first shaft moves with respect to a second shaft to a position different from that shown in FIG. 3.

The shafts 10 and 20 include a positioning device 30 coupled thereto. The shaft 10 is adapted to be unmovably positioned with respect to the shaft 20 at various positions by the positioning device 30. The positioning device 30 is movable to a release position and a lock position.

Figure 4:
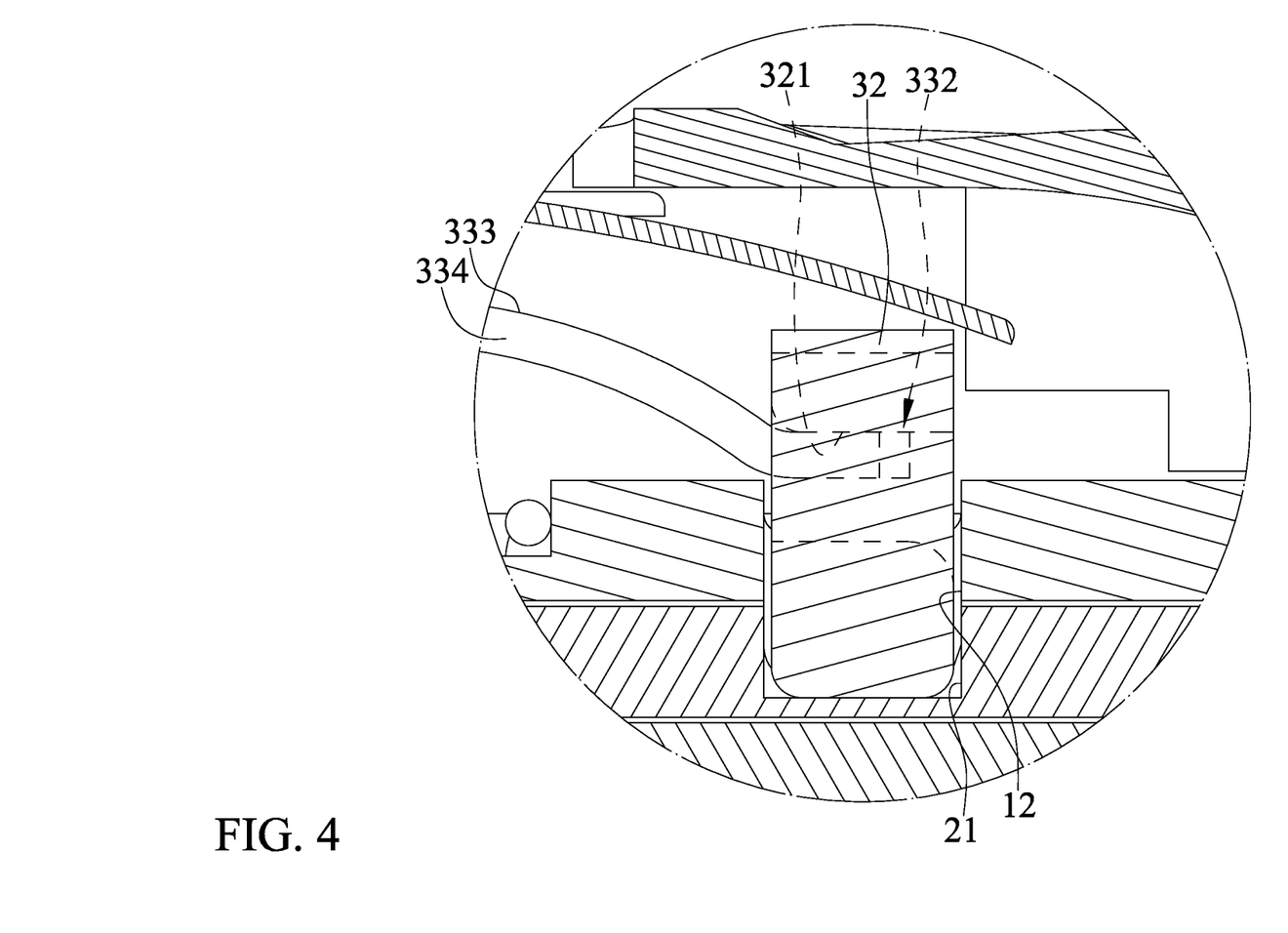
FIG. 4 is a partial, enlarged view of FIG. 3.

The positioning device 30 includes a control 31 being movable and a fastener 32 being movable and actuated by the control 31. The control 31 includes an actuator 311 and a seat 312. The actuator 311 is disposed on the seat 312. The actuator 311 is moved by a user to move the control 31. The seat 312 is disposed and movable on the outer periphery of the shaft 20. The seat 312 moves on the on the outer periphery of the shaft 20 in response to movement of the control 31. The fastener 32 is movable with respect to the control 31. The fastener 32 inserts and is movable in the orifice 12.

Further, the control 31 includes a link 33 defining a guiding portion 333. The link 33 extends longitudinally from an end 331 to an end 332. The fastener 32 is disposed and movable on the guiding portion 333. The fastener 32 is movable between a first position and a second position of the guiding portion 333. The first and the second positions of the guiding portion 333 are at different heights. Moreover, the guiding portion 333 extends from the first position to the second position arcuately. The guiding portion 333 is resilient. The guiding portion 333 is made of metal.

Further, the fastener 32 has a wider width portion and a narrower width portion. The wider portion is borne by the guiding portion 333. The narrower width portion defines a neck 321. The guiding portion 333 defines a slot 334 receiving the neck 321. The guiding portion 333 includes two extensions and the slot 334 is between the two extensions. The neck 321 of the fastener 32 is disposed between the two extensions.

The positioning device 30 includes a biasing member 35. The biasing member 35 includes an end abutting the control 31 and another end abutting the shaft 10. The biasing member 35 is a compression spring and sleeves on the shaft 20.

Figure 6:
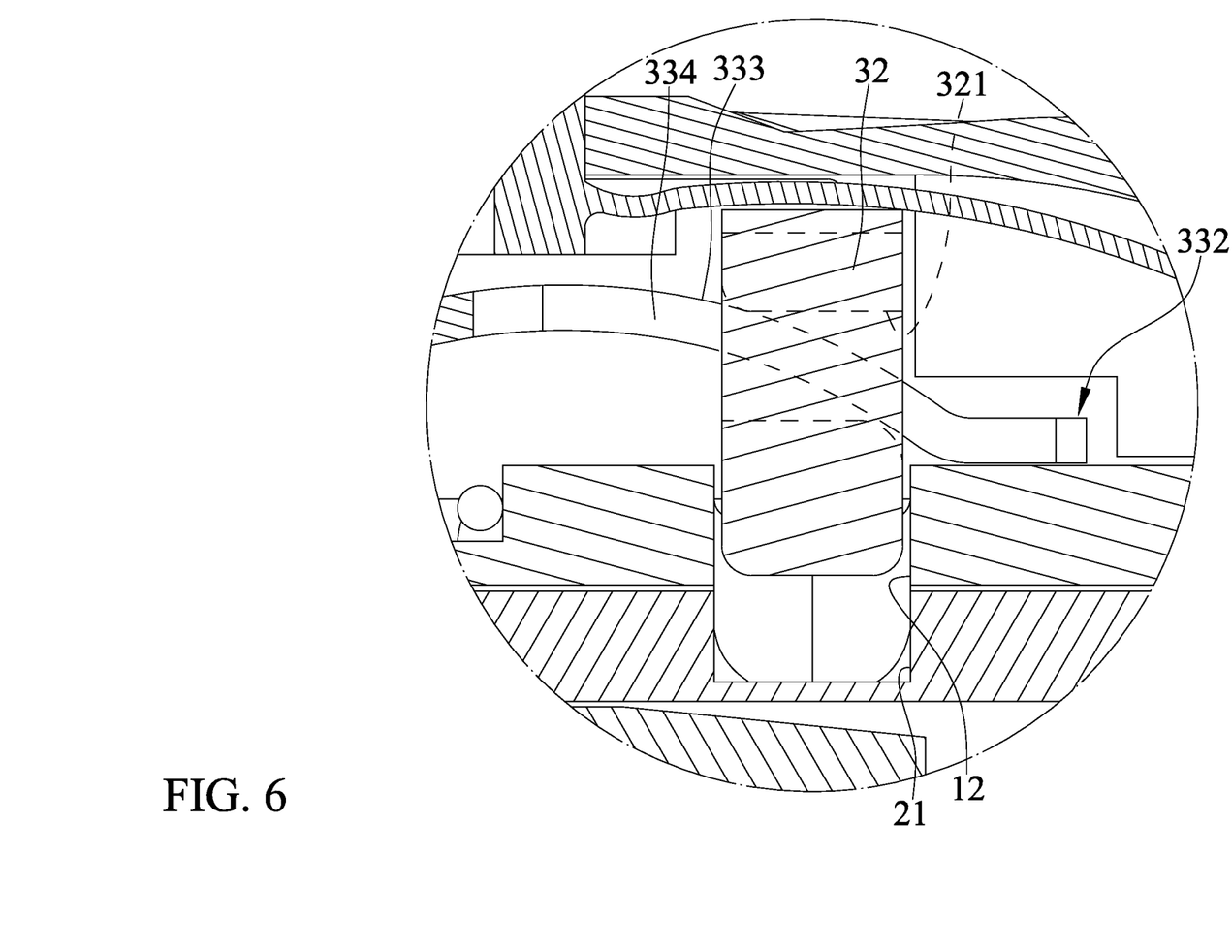
FIG. 6 is a partial, enlarged view of FIG. 5.

When the shafts 10 and 20 are positioned at one of the various positions, one of the plurality of engaging portions 21 is aligned with the orifice 12, the positioning device 30 move to the lock position, the control 31 moves to a first position, and the fastener 32 engages with one of plurality of engaging portions 21. When the shaft 10 moves with respect to the shaft 10, the positioning device 30 move to the release position, the control 31 moves to a second position, and the fastener 32 disengages from any of plurality of engaging portions 21. The control 31 moves from the first position to the second positions or vice versa axially. The fastener 32 engaging with one of the plurality of engaging portions 21 moves to the first position of the guiding portion 333. The fastener 32 disengaging from any of the plurality of engaging portions 21 moves to the second position of the guiding portion 333. The biasing member 35 is compressed in response to movement of the control 31 from the second position to the first position. The control 31 moving from the first position to the second position is urged by the biasing member 35.

Further, the shaft 10 is prevented from separating from the shaft 20. The orifice 13 includes a fastener 36 inserting therein. The fastener 36 protrudes out of the orifice 13. The outer periphery of the shaft 20 defines a groove 22. The fastener 36 inserts in the groove 22. The fastener 36 is movable in the groove 22 and moves in response to relative movements between the shafts 10 and 20. The fastener 36 is restrained from moving out of the groove 22, thereby preventing the shaft 10 from separating from the shaft 20.

Further, the shafts 10 and 20 includes a housing 34 coupled thereto. The housing 34 defines a receptacle 344 and an orifice 345. The actuator 311 inserts and is movable in the receptacle 344. The actuator 311 moves in the receptacle 344 in response to movement of the control 31. The orifice 345 is connected to the orifice 13. The fastener 36 inserts through the orifice 345 into the orifice 13. The link 33 and the biasing member 35 are disposed in the housing 34. The housing 34 has two separate parts, with a first part defining a portion 341, and with a second part defining a portion 342 and a portion 343. The housing 34 is strengthened by a strengthening ring 37. The strengthening ring 37 is disposed in the housing 34. The first part is inserted in the strengthening ring 37. The strengthening ring 37 is inserted and disposed in the housing 34. The strengthening ring 37 extends arcuately in a circumferential direction of the housing 34. The strengthening ring 37 and the housing 34 are made out of different materials. Preferably, the strengthening ring 37 is harder than the housing 34. Preferably, the strengthening ring 37 is made from metal. The strengthening ring 37 is an open ring and defines an opening 371, and the actuator 311 inserts and is movable in the opening 371.

Figure 7:
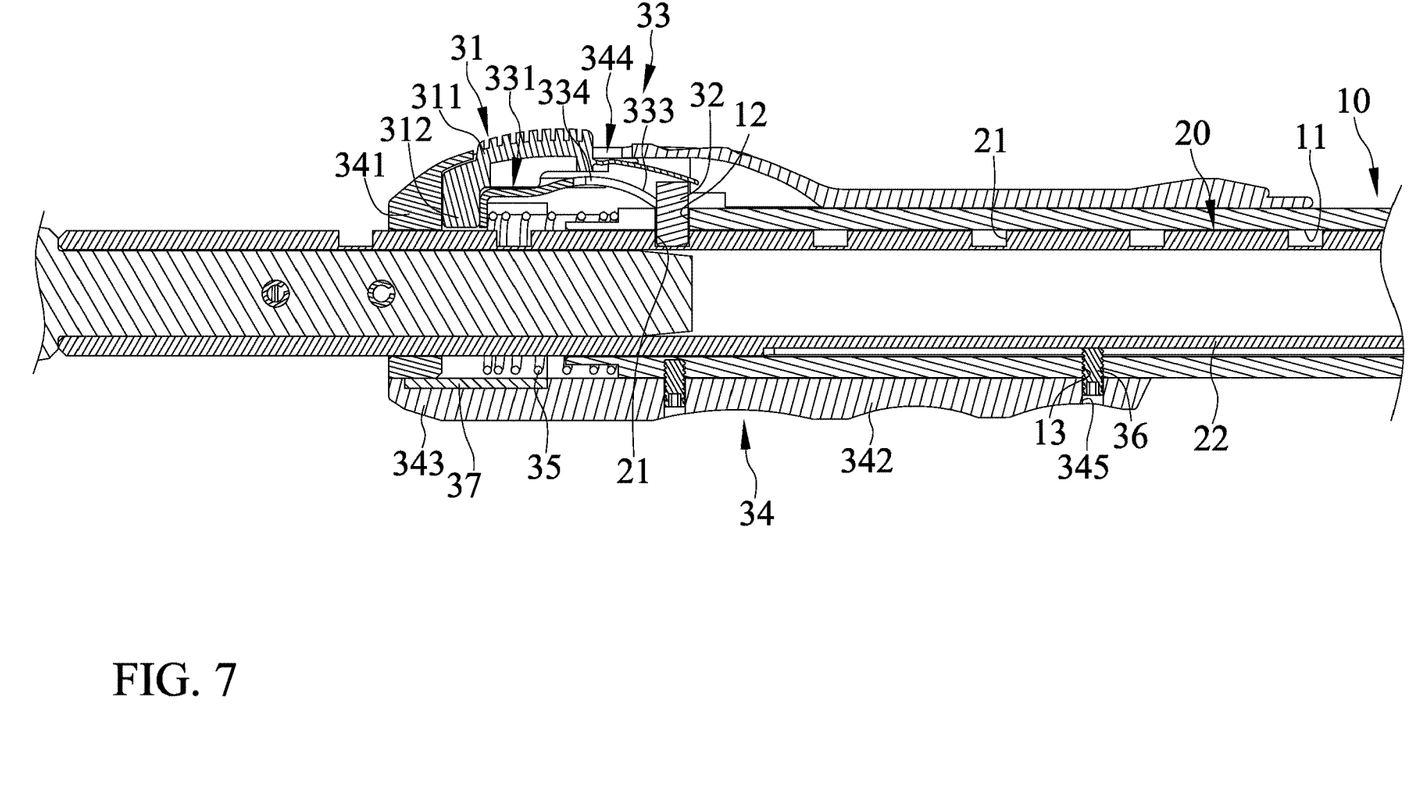
FIG. 7 is a cross-sectional view of the telescopic device of FIG. 1, which includes the positioning device in a lock position and includes the first shaft is in a relative position with respect to the second shaft different from that shown in FIG. 3.

In view of the foregoing, the shaft 10 is adapted to be unmovably positioned with respect to the shaft 20 at various positions by the positioning device 30. When the shafts 10 and 20 are positioned at one of the various positions, one of the plurality of engaging portions 21 is aligned with the orifice 12, the positioning device 30 move to the lock position, the control 31 moves to a first position, and the fastener 32 engages with one of plurality of engaging portions 21. When the shaft 10 moves with respect to the shaft 10, the positioning device 30 move to the release position, the control 31 moves to a second position, and the fastener 32 disengages from any of plurality of engaging portions 21.

The foregoing is merely illustrative of the principles of this invention and various modifications can be made by those skilled in the art without departing from the scope and spirit of the invention.

What is claimed is:

1. A telescopic device comprising: a first shaft defines a hole and a first orifice connected to the hole; a second shaft inserting in the hole of the first shaft and being movable with respect to the first shaft, wherein the second shaft includes an outer periphery defining a plurality of engaging portions, and wherein the second shaft is movable with respect to the first shaft to a position in which one of the plurality of engaging portions is aligned with the first orifice; and a positioning device coupled to the first and the second shafts, wherein the positioning device includes a control being movable and a first fastener being movable and actuated by the control, wherein the first fastener is movable with respect to the control, wherein the first fastener inserts and is movably disposed in the first orifice, and wherein the first fastener is selectively engaged with and disengaged from the plurality of the engaging portions;

wherein the first shaft is adapted to be unmovably positioned with respect to the second shaft at various positions, wherein when the first and the second shafts are positioned at one of the various positions, the control moves to a first position, and the first fastener engages with one of plurality of engaging portions, and wherein when the first shaft moves with respect to the second shaft, the control moves to a second position, and the first fastener disengages from any of plurality of engaging portions;

wherein the control includes a link defining a guiding portion, wherein the first fastener is disposed and movable on the guiding portion, wherein the first fastener is movable between a first position and a second position of the guiding portion, wherein the first and the second positions of the guiding portion are at different heights, wherein the first fastener engaging with one of the plurality of engaging portions moves to the first position of the guiding portion, and wherein the first fastener disengaging from any of the plurality of engaging portions moves to the second position of the guiding portion;

and wherein the guiding portion defines a slot.

2. The telescopic device as claimed in claim 1, wherein the control moves from the first position to the second positions or vice versa axially.

3. The telescopic device as claimed in claim 1, wherein the first fastener has a wider width portion and a narrower width portion, wherein the wider portion is borne by the guiding portion, wherein the narrower width portion defines a neck, and wherein the guiding portion defining the slot receives the neck.

4. The telescopic device as claimed in claim 3, wherein the guiding portion includes two extensions and the slot is between the two extensions, and wherein the neck of the first fastener is disposed between the two extensions.

5. The telescopic device as claimed in claim 1, wherein each of the plurality of engaging portions is in a form of a recess.

6. The telescopic device as claimed in claim 1, wherein the first shaft defines a second orifice connected to the hole, wherein the second orifice includes a second fastener inserting therein, wherein the second fastener protrudes out of the second orifice, wherein the outer periphery of the second shaft defines a groove, wherein the second fastener inserts in the groove, wherein the second fastener is movable in the groove and moves in response to relative movements between the first and the second shafts, and wherein the second fastener is restrained from moving out of the groove, thereby preventing the first shaft from separating from the second shaft.

7. The telescopic device as claimed in claim 6 further comprising a housing coupled to the first and the second shafts, wherein the housing defines a receptacle and a third orifice, wherein the control includes an actuator, wherein the actuator inserts and is movable in the receptacle, wherein the actuator moves in the receptacle in response to movement of the control, wherein the third orifice is connected to the second orifice, and wherein the second fastener inserts through the third orifice into the second orifice.

8. The telescopic device as claimed in claim 7, wherein the control includes a link defining a guiding portion, wherein the first fastener is disposed and movable on the guiding portion, wherein the first fastener is movable between a first position and a second position of the guiding portion, wherein the first and the second positions of the guiding portion are at different heights, wherein the first fastener engaging with one of the plurality of engaging portions moves to the first position of the guiding portion, wherein the first fastener disengaging from any of the plurality of engaging portions moves to the second position of the guiding portion, and wherein the link is disposed in the housing.

9. The telescopic device as claimed in claim 7 further comprising a strengthening ring disposed in the housing.

10. The telescopic device as claimed in claim 7, wherein the control includes a seat, wherein the actuator is disposed on the seat, wherein the seat is disposed and movable on the outer periphery of the second shaft, and wherein the seat moves on the outer periphery of the second shaft in response to movement of the control.

11. The telescopic device as claimed in claim 1, wherein the positioning device includes a biasing member, wherein the biasing member includes an end abutting the control and another end abutting the first shaft, and wherein the biasing member is compressed in response to movement of the control from the second position to the first position.

12. The telescopic device as claimed in claim 7, wherein the positioning device includes a biasing member, wherein the biasing member includes an end abutting the control and another end abutting the first shaft, wherein the biasing member is compressed in response to movement of the control from the second position to the first position, and wherein the biasing member is disposed within the housing.

13. The telescopic device as claimed in claim 12, wherein the biasing member is a compression spring and sleeves on the second shaft.

14. The telescopic device as claimed in claim 1, wherein the guiding portion extends from the first position to the second position arcuately.

15. The telescopic device as claimed in claim 1, wherein the guiding portion is resilient.

16. The telescopic device as claimed in claim 15, wherein the guiding portion and made of metal.

17. The telescopic device as claimed in claim 9, wherein the strengthening ring and the housing are made out of different materials.

18. The telescopic device as claimed in claim 17, wherein the strengthening ring is made from metal.

19. The telescopic device as claimed in claim 9, wherein the strengthening ring is an open ring and defines an opening, and wherein the actuator inserts and is movable in the opening.

* * * * *